(12) United States Patent
Kaplan et al.

(10) Patent No.: US 10,719,142 B2
(45) Date of Patent: Jul. 21, 2020

(54) MULTI-FUNCTIONAL STYLUS

(71) Applicant: Microsoft Technology Licensing, LLC, Redmond, WA (US)

(72) Inventors: Ron Kaplan, Nes Ziona (IL); Timothy A. Jakoboski, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 128 days.

(21) Appl. No.: 15/820,465

(22) Filed: Nov. 22, 2017

(65) Prior Publication Data

US 2019/0155410 A1 May 23, 2019

(51) Int. Cl.
*G06F 3/0354* (2013.01)
*G06F 3/044* (2006.01)
*G06F 3/041* (2006.01)

(52) U.S. Cl.
CPC .......... *G06F 3/03545* (2013.01); *G06F 3/044* (2013.01); *G06F 3/0414* (2013.01); *G06F 2203/04101* (2013.01); *G06F 2203/04105* (2013.01)

(58) Field of Classification Search
CPC ............... G06F 3/03545; G06F 3/0354–03546
See application file for complete search history.

(56) References Cited

U.S. PATENT DOCUMENTS

| 5,959,616 A | 9/1999 | Challener |
| 6,115,030 A | 9/2000 | Berstis et al. |
| 9,436,296 B2 * | 9/2016 | Boulanger ............ G06T 11/001 |
| 9,448,646 B1 | 9/2016 | Fleck et al. |
| 10,114,482 B2 * | 10/2018 | Boulanger ............ G06T 11/001 |
| 10,241,613 B2 * | 3/2019 | Shim ...................... G06F 3/0425 |
| 2009/0164937 A1 * | 6/2009 | Alviar ................. G06F 3/03547 |
| | | 715/800 |
| 2013/0207938 A1 * | 8/2013 | Ryshtun ................ G06F 3/0416 |
| | | 345/179 |
| 2014/0125606 A1 * | 5/2014 | Namkung ........... G06F 3/03545 |
| | | 345/173 |

(Continued)

FOREIGN PATENT DOCUMENTS

CN 201859398 U 6/2011
CN 204808231 U 11/2015

(Continued)

OTHER PUBLICATIONS

"Apple patents a stylus which is more than just a digital pen", Retrieved From <<http://www.deccanchronicle.com/technology/in-other-news/270716/apple-patents-a-stylus-which-is-more-than-just-a-digital-pen.html>>, Jul. 27, 2016, 9 pages.

(Continued)

*Primary Examiner* — Gene W Lee

(57) ABSTRACT

A stylus includes an elongated housing, a tip extending from a first end of the elongated housing and a tri-axial force sensor mounted on a second end. A first wireless transmitter transmits a signal via the tip based on which the tip interacts with a digitizer sensor of a touch screen. The tri-axial force sensor senses contact force applied by a user pressing against the tri-axial sensor. A second wireless transmitter transmits output sensed by the tri-axial force sensor. The stylus further includes a controller that controls transmission of the first wireless transmitter and the second wireless transmitter.

20 Claims, 8 Drawing Sheets

(56) References Cited

U.S. PATENT DOCUMENTS

| | | |
|---|---|---|
| 2015/0363013 A1* | 12/2015 | Coutts ................. G06F 3/03545 345/179 |
| 2016/0062492 A1 | 3/2016 | Geller et al. |
| 2016/0139690 A1 | 5/2016 | Chang |
| 2016/0306444 A1 | 10/2016 | Fleck |
| 2017/0045962 A1 | 2/2017 | Stern et al. |
| 2017/0270357 A1* | 9/2017 | Winebrand ........ G06K 9/00416 |
| 2017/0322665 A1* | 11/2017 | Shim ..................... G06F 3/0425 |

FOREIGN PATENT DOCUMENTS

| | | |
|---|---|---|
| WO | 2017007800 A1 | 1/2017 |
| WO | 2017011001 A1 | 1/2017 |

OTHER PUBLICATIONS

Tian, et al., "An exploration of pen tail gestures for interactions", In International Journal of Human-Computer Studies, vol. 71, No. 5, May 2013, pp. 551-569.

"International Search Report and Written Opinion Issued in PCT Application No. PCT/US2018/060201", dated Jan. 24, 2019, 14 Pages.

\* cited by examiner

MULTI-FUNCTIONAL STYLUS

BACKGROUND

Active styluses are known in the art for use with a touch enabled computing device. An active stylus interacts with a touch-screen of the device based on emitting a signal at or near its writing tip. The signal emitted is generated with a signal generator housed in the stylus. The signal generator may generate a position signal and may also generate modulation including information such as pressure applied on the writing tip and stylus identification.

The touch-screen includes a Flat Panel Display (FPD) integrated with a digitizer sensor. Integration may be based on the digitizer sensor overlaid on the FPD, integrated on a protective glass layer of the FPD (on-cell technology) or integrated as part of the FPD (in-cell technology). The digitizer sensor typically includes a matrix of electrode junctions arranged in rows and columns.

The signal emitted by the active stylus is picked up by the digitizer sensor when electrostatic coupling is established between the writing tip and a portion of the matrix of electrode junctions. The electrostatic coupling is a result of proximity of the writing tip to the digitizer sensor. Positions of the writing tip over the screen are correlated with virtual information portrayed on the touch-screen. Digitizer sensors that track signals emitted by the stylus also typically track input provided with a finger or conductive object. A mutual capacitive sensor is one type of digitizer sensor that is integrated with FPD to form a touch-screen.

SUMMARY

Known active styluses are limited in their functionality. For example, they have not successfully replaced the conventional mouse. One of the limitations of the active stylus when operated as a mouse is the inconvenience of having to operate the stylus over the touch-screen. At times positioning the stylus over the touch-screen may obstruct the user's view. In addition, cursor control based on moving the writing tip over the touch-screen may be limited due to size of the screen and resolution of the digitizer sensor.

According to aspects of some embodiments of the present disclosure, additional and improved functionality is added to the active stylus by adding a pointing stick or an optical sensor to the stylus. Input from the pointing stick or the optical sensor may then be transmitted to the computing device via another wireless channel, e.g. Bluetooth communication, near field communication (NFC), radio frequency (RF) that is independent from the electrostatic channel of the touch-screen. According to some example embodiments, a stylus may automatically switch between transmission via the electrostatic channel associated with the touch-screen and transmission via another wireless channel based on sensing proximity of the stylus to the touch-screen.

Unless otherwise defined, all technical and/or scientific terms used herein have the same meaning as commonly understood by one of ordinary skill in the art. Although methods and materials similar or equivalent to those described herein can be used in the practice or testing of embodiments of the disclosure, example methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the disclosure are herein described, by way of example only, with reference to the accompanying drawings. With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

In the drawings.

DETAILED DESCRIPTION

The disclosure in some embodiments relates to an active stylus that is configured to provide input to a device based on its writing tip touching and hovering over a touch-screen of the device and is also configured to provide input to the device based on a user actuating a sensor integrated on a housing of the stylus. The additional input provided by the sensor may improve the functionality of the stylus when operated for controlling a cursor displayed on the touch-screen and may also provide additional functionality.

In some example embodiments, the sensor is a pointing stick, e.g. a trackpoint sensor integrated on a tail end of the stylus. A user may conveniently operate the pointing stick by holding the stylus and pushing the pointing stick with a thumb or a finger. The pointing stick may sense axial force in two dimensions or in three dimensions. Optionally, the pointing stick provides air mouse functionality and joystick functionality. In some example embodiments, input from the pointing stick and input from the writing tip are combined and are used by the device for gesture control or improved joystick control. In some example embodiments, input from a pressure sensor integrated with the writing tip provides an Z data and control that may be combined with X-Y data detected with the pointing stick.

In other example embodiments, the sensor is an optical sensor configured to track movement of the stylus on a surface other than the touch-screen. The optical sensor may provide mouse functionality. In some example embodiments, the optical sensor is configured to track movement both while the stylus is positioned horizontally on a surface and while the stylus is positioned in a writing orientation. Optionally, the stylus additionally includes buttons for right mouse click and left mouse click and a sensing strip to control scrolling and thereby provide full mouse emulation.

According to some example embodiments, a user may seamless switch between using the writing tip over the touch-screen to provide input via the electrostatic channel and using one of the pointing stick and the optical sensor to provide input via an alternate wireless channel.

Figure 1:
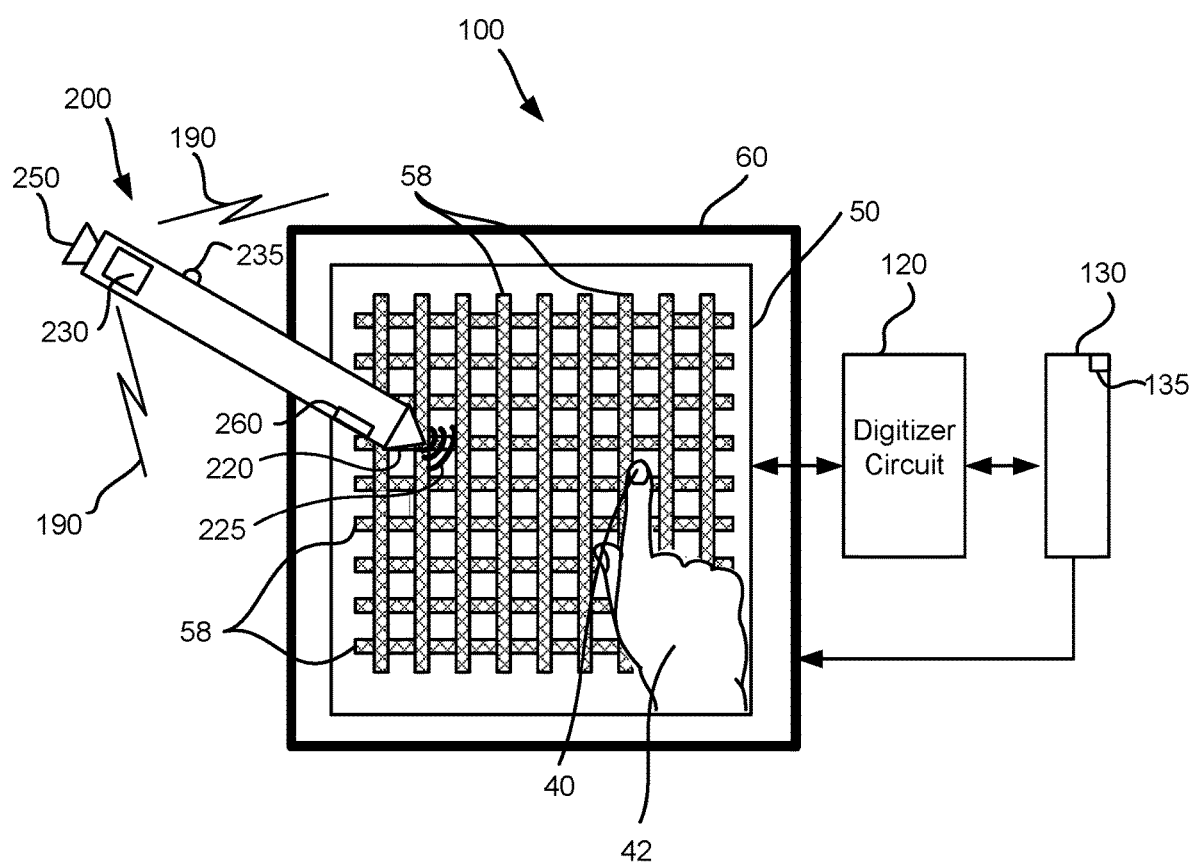
FIG. 1 is a simplified block diagram of an example multi-functional stylus interacting with a touch enabled computing device.

Reference is now made to FIG. 1 showing a simplified block diagram of an example multi-functional stylus and a touch enabled computing device. A stylus 200 may include a writing tip 220 that provides touch input to a touch-screen 60 of a touch enabled device 100 and may also include a pointing stick 250 or an optical sensor 260 based on which a user may provide additional input with stylus 200 for controlling objects displayed on the touch screen or for providing electronic inking.

In some example embodiments, the additional input may be transmitted to a host 130 of device 100 via a wireless communication channel 190 between wireless communication unit 230 and module 1305 of host 130. Communication unit 230 may be a channel with Bluetooth communication, near field communication (NFC), radio frequency (RF) communication.

Touch input may be detected and tracked based on stylus 200 emitting signal 225 via tip 220 and digitizer sensor 50 picking up signal 225 at a location near writing tip 220. Signal 225 may be a pulsed signal transmitted at a defined repeat rate, e.g. every 5-20 msec. In some examples, the pulsed signal includes a position signal (or beacon) and a train of data defining a plurality of parameters. The parameters may be directly related to stylus 200, related to an environment around the stylus 200, related to a user using stylus 200, related to privileges allotted to the stylus 200, ma specify capabilities of stylus 200, or provide information received from a sensor such as a optical sensor 260 or a pointing stick 250. Information related to stylus 200 may include indications of a pressed button(s) 235, pressure level on tip 220 as detected by a tip sensor included in stylus 200, tilt, identification, manufacturer, version, media access control (MAC) address, and stored configurations such as color, tip type, brush, and add-ons.

Optionally, digitizer sensor 50 may be a grid based capacitive sensor formed with row and column conductive strips 58 or a matrix of electrode junctions not necessarily constructed based on row and column conductive strips. A digitizer circuit 120 samples output from conductive strips 58 to detect stylus signals pick up by digitizer sensor 50. Coordinates of stylus 200 and data transmitted by stylus 200 may be determined from the signals picked up by digitizer sensor 50. In some examples, digitizer circuit 120 manages pairing with stylus 200. Processing of the stylus signal 225 may be with digitizer circuit 120 or with host 130.

Digitizer circuit 120 may also apply mutual capacitance detection or a self-capacitance for sensing a touch signal from touch (or hover) of fingertip 40 from a hand 42. During mutual capacitance and self-capacitance detection, digitizer circuit 120 sends a triggering signal, e.g. pulse to one or more conductive strips 58 of digitizer sensor 50 and samples output from conductive strips 58 in response to the triggering. Coordinates of fingertip 40 may be computed by digitizer circuit 120 or by host 130 from the sampled output. The triggering signal may also be used by stylus 200 as an uplink signal based on which stylus 200 identifies the digitizer system and synchronizes with its detection periods.

Output from digitizer circuit 120 is reported to host 130. The output provided to host 130 may include coordinates of one or more fingertips 40, coordinates of writing tip 220 of stylus 200 and additional information provided by stylus 200, e.g. pressure, tilt, and battery level. Host 130 may transmit the information to an application manager or a relevant application. Host 130 may also transmit data to stylus 200 with wireless module 135.

Figure 2A:
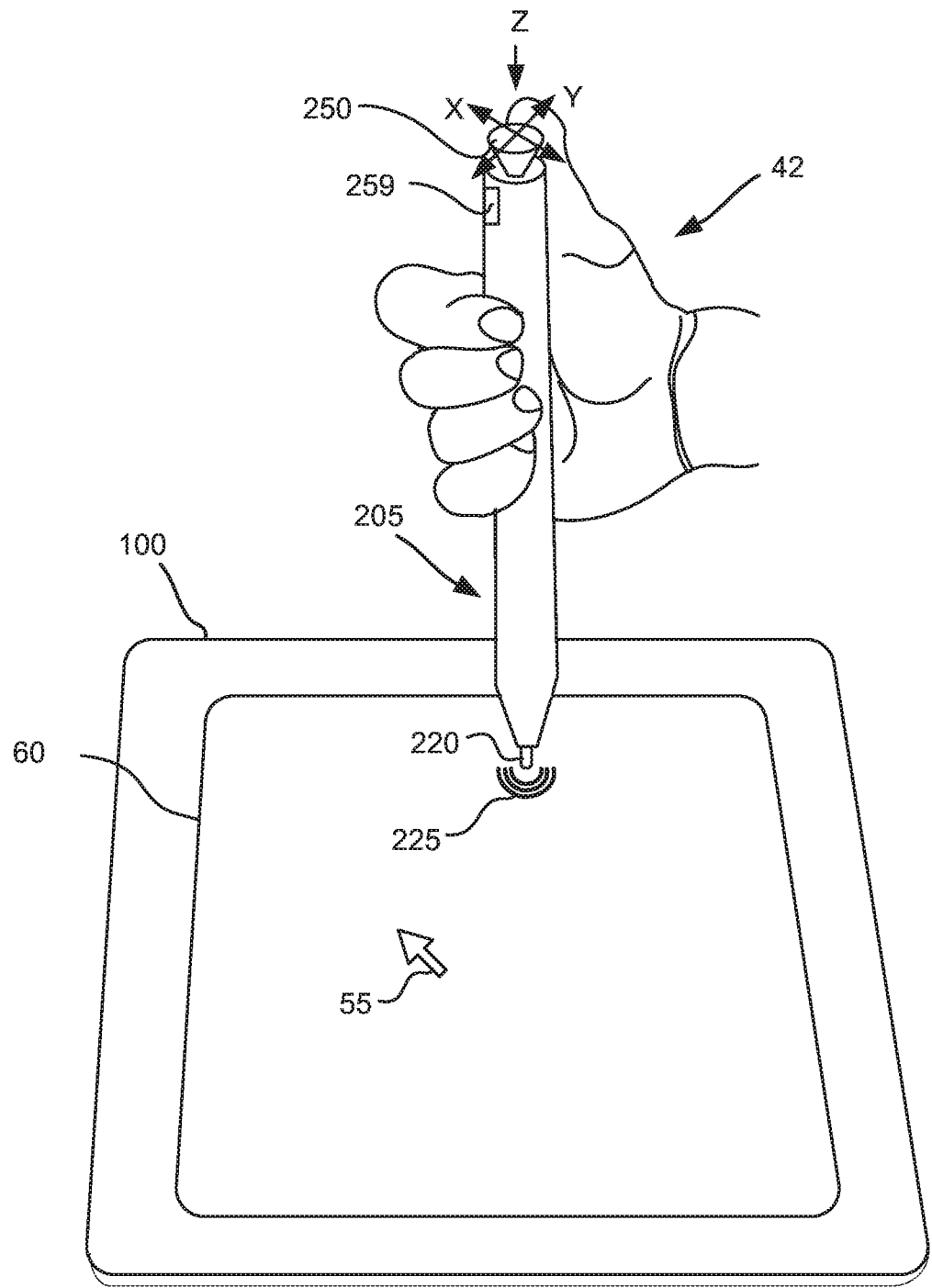
FIGS. 2A and 2B are schematic drawing of a user operating an example pointing stick on a stylus to interact with a computing device while the stylus is positioned on the touch-screen and away from the touch-screen respectively.
Figure 2B:
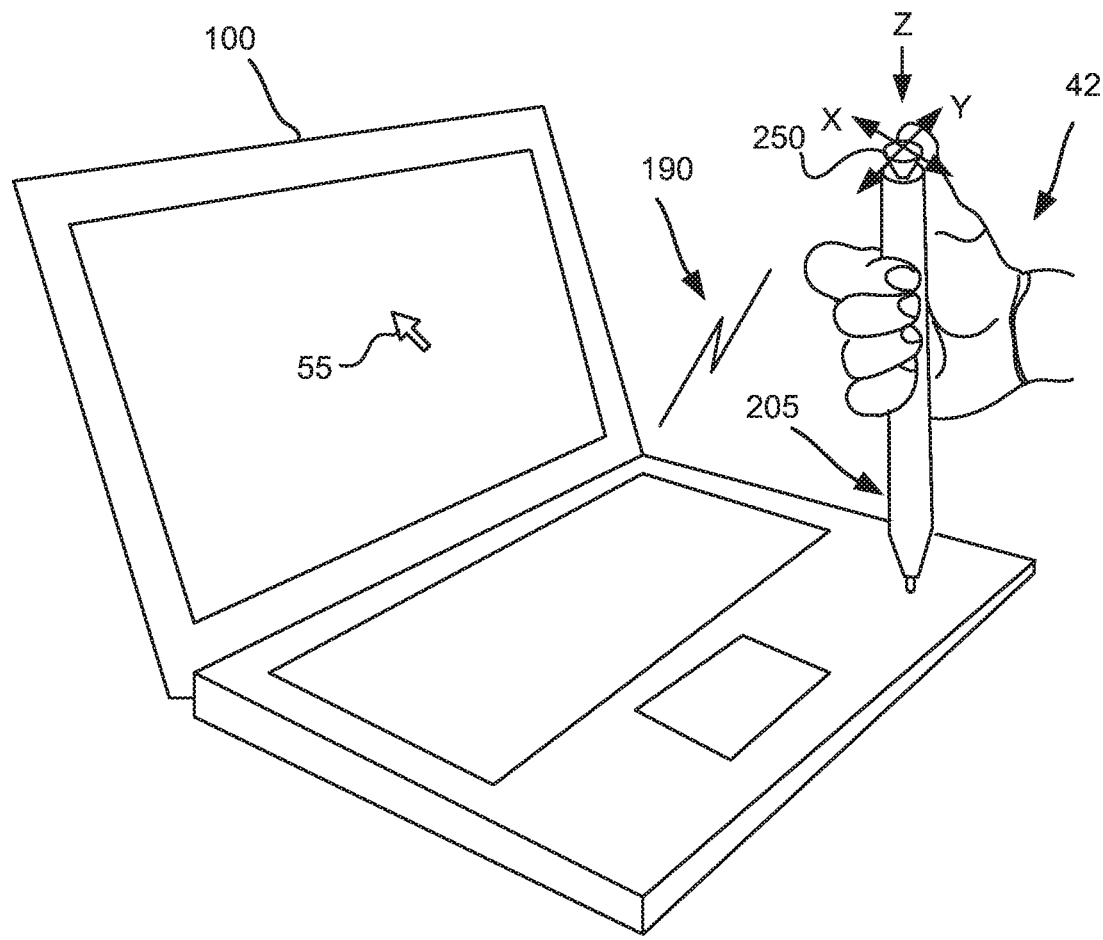

Reference is now made to FIGS. 2A and 2B showing schematic drawing of a user operating an example pointing stick on a stylus to interact with a computing device while the stylus is positioned on the touch-screen and away from the touch-screen respectively. In some example embodiments, a pointing stick 250 is installed at a tail end of a stylus 205 opposite an end including writing tip 220. Pointing stick 250 may sense applied force in the X and Y direction and may be actuated by pushing with a thumb or fingers in the general direction the user wants the cursor to move. Optionally, pointing stick is also sensitive to force applied in the Z direction as when pushing pointing stick in a longitudinal direction of stylus 205. Optionally, mouse click may be emulated based on force applied in the Z direction. In some example embodiments, one of the X or Y directions of pointing stick 250 may be aligned with a marking 259 on stylus 205 to provide indication of the control directions. Input from pointing stick 250 may be transmitted to a device 100 and may be applied to move a cursor 55. A velocity at which cursor 55 moves may be related to the force applied on pointing stick 250. Increasing the force that a user applies on pointing stick 250 increases the velocity at which cursor 55 moves. A relation between applied force and cursor speed can be adjusted, similar to the way mouse speed is known to be adjusted. In other example embodiments, pointing stick 250 may be used as a joystick. Input provided to device 100 by pointing stick 250 may be similar to the input provided by a trackpoint button integrated on a keyboard. Optionally, additional data is provided based on Z control included in pointing stick 250.

According to some example embodiments, sensed force in the X, Y and Z directions, or commands based on the sensor force may be transmitted to a touch enabled device. In some example embodiments, the electrostatic channel may be used to transmit the data or commands when stylus 205 is positioned over touch-screen 60 (FIG. 2A). Optionally, force data may be modulated on a signal transmitted by stylus 205. In other examples, the data or commands may be transmitted via an alternate wireless channel 190 while stylus 205 is displaced from touch-screen 60.

In some example embodiments, input from pointing stick 250 may be detected while a stylus is paired with touch screen 60 and input from pointing stick 250 may be applied for gesture control.

Figure 3:
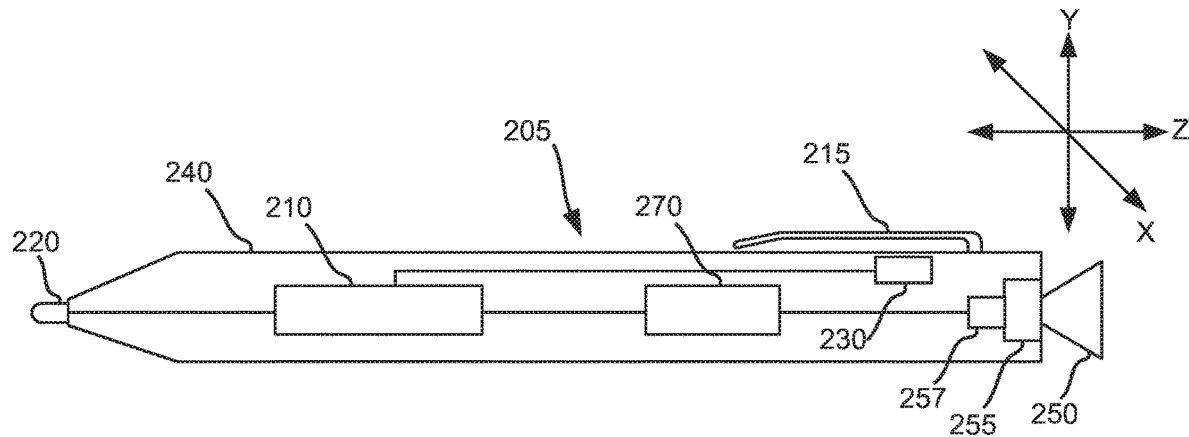
FIG. 3 is a simplified block diagram of the stylus including the example pointing stick on a tail end of the stylus.

Reference is now made to FIG. 3 showing a simplified block diagram of a stylus including an example pointing stick on a tail end of the stylus. According to example embodiments, a stylus 205 includes a circuit 210, e.g. an application specific integrated circuit (ASIC) that may control operation of the stylus, a power source 270, e.g. one or more batteries and a wireless transmission unit 230 all housed in a housing 240 of stylus 205. Optionally, power source 270 is configured for being recharged for example in a garage associated with device 100. Stylus 205 additionally includes a writing tip 220 extending from one end of stylus 205 and a pointing stick 250 extending from an opposite end of stylus 205. In some example embodiments, force applied on pointing stick 250 in the X and Y direction may be sensed with a sensor 255 and force applied in the Z direction may be sensed with a sensor 257. Optionally, sensor 257 may be a tip switch that toggles based on pressing in the Z direction. Sensor 255 may be for example a pair of linear magnetic encoders or a pair of resistive strain gauges. Direction of X-Y sensors may be visually indicated by aligning one of the X or Y directions, e.g. the Y direction with a clip 215 of stylus 205 or other indication on housing 240 that is apparent to a user. ASIC 210, e.g. the stylus control circuit may control transmission of output from sensors 255 and 257 via writing tip 220 or via wireless module 230.

Figure 4A:
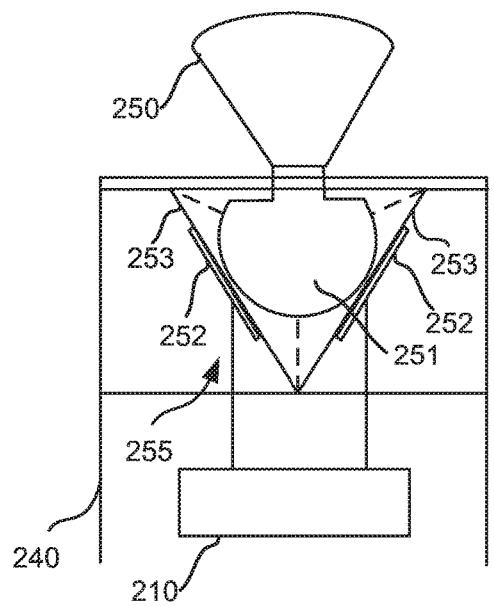
FIGS. 4A and 4B are schematic drawings of an example pointing stick sensor in a neutral and pushed positioned.
Figure 4B:
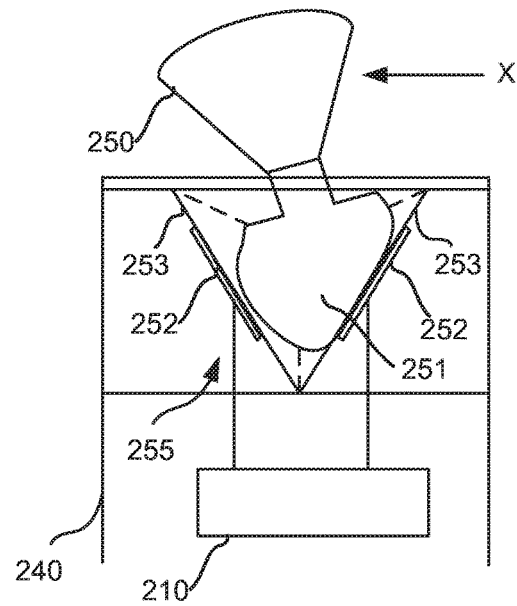

Reference is now made to FIGS. 4A and 4B showing a schematic drawing of an example pointing stick sensor in a neutral and pushed positioned respectively. Optionally, pointing stick 250 may be connected to an elastic or compressible element 251 that is housed in a pyramid structure 255. Pyramid structure 255 may include four walls 253 aligned in a defined X and Y direction and may be fixed or integrated with housing 240. Electrodes 252 may be patterned or positioned on each of the four walls of pyramid 255. Inner walls 253 may provide electrical isolation between electrodes 252 and elastic element 251. Electrodes 252 may be connected to ASIC 210. Elastic element 251 may be rounded, e.g. spherically or hemi-spherically shaped and may include conductive material. Flattening of elastic element 251 increases capacitive coupling between elastic element 251 and one or more of the electrodes 252 on the pyramid structure.

As pointing stick 250 is pushed, elastic element 251 presses and flattens against one or more inner walls 253 of pyramid structure 255. Elastic element 251 may flatten against each of wall 253 with varying degrees based on a direction and magnitude of the force applied on pointing stick 250. Direction and magnitude of the force applied on pointing stick 250 may be sensed based on a sensed capacitive coupling with each of the electrodes 252. Force applied in the Z direction may be based on a symmetric force detected on each of electrodes 252 while force applied in the X or Y direction may be based on asymmetric force applied on electrodes 252.

Figure 5:
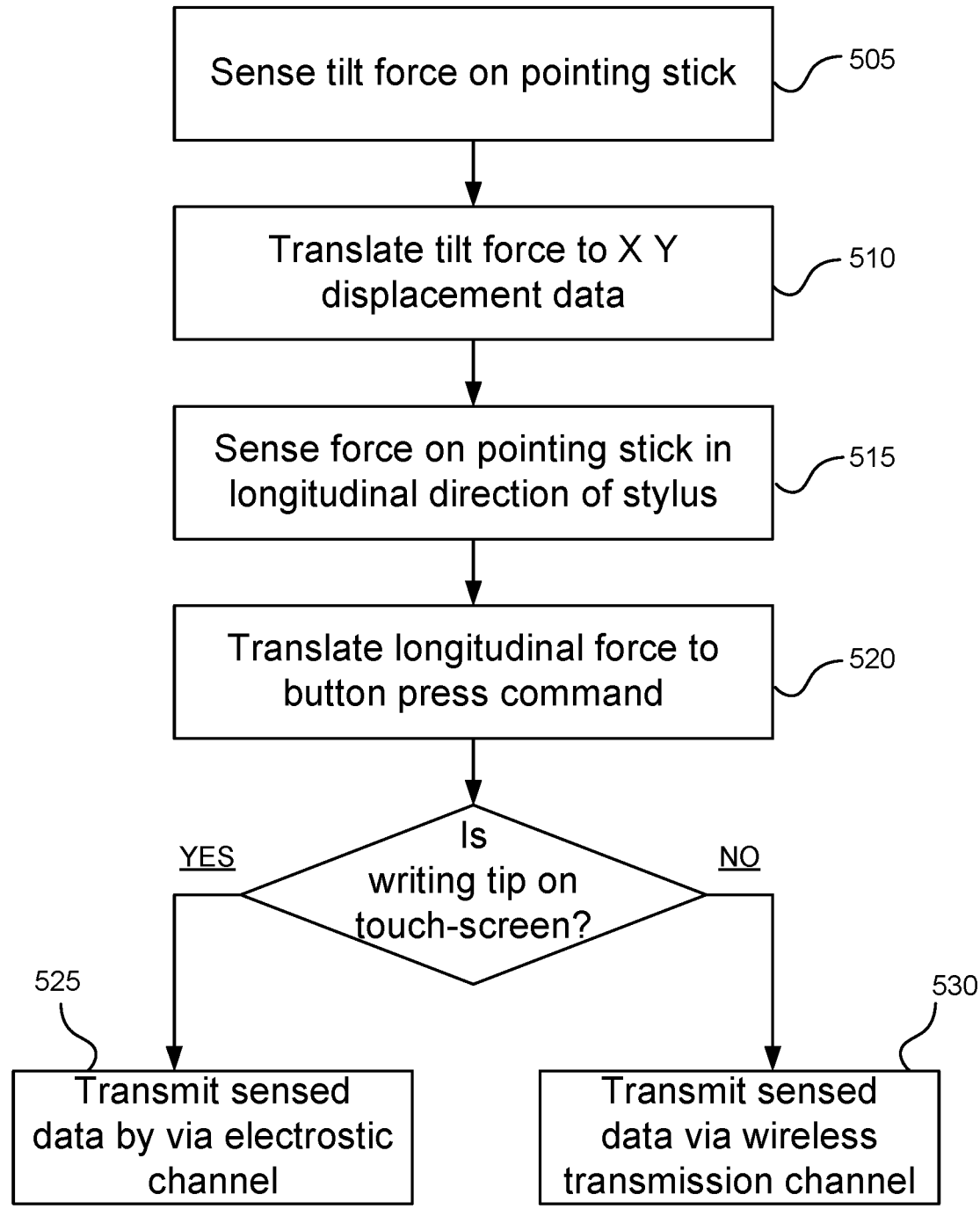
FIG. 5 is a simplified flow chart of an example method for operating an active stylus including a pointing stick integrated on a tail end of the stylus.

Reference is now made to FIG. 5 showing a simplified flow chart of an example method for operating a pointing stick integrated on a tail end of an active stylus. In some example embodiments, a circuit in a stylus is senses a tilt force on pointing stick in an X-Y directions (block 505). For example circuit 210 may sense tilt force applied on pointing stick 250 of stylus 205 (FIG. 3). Optionally, a circuit in the stylus may translate the sensed tilt force to X-Y displacement data (block 510). In some example embodiments, the pointing stick is also sensitive to a force applied in a longitudinal direction of the stylus that presses the pointing stick into the stylus housing (block 515). In some example embodiments, a longitudinal force above a defined threshold may be translated as a button press command (block 520).

Optionally, the circuit in the stylus may detect the button press command. X-Y displacement data and button press data may be transmitted by via the electrostatic channel while a writing tip of the stylus is positioned on the touch-screen (block 525) and may be transmitted by wireless transmission (block 530) while the stylus is displaced from the touch-screen.

Figure 6A:
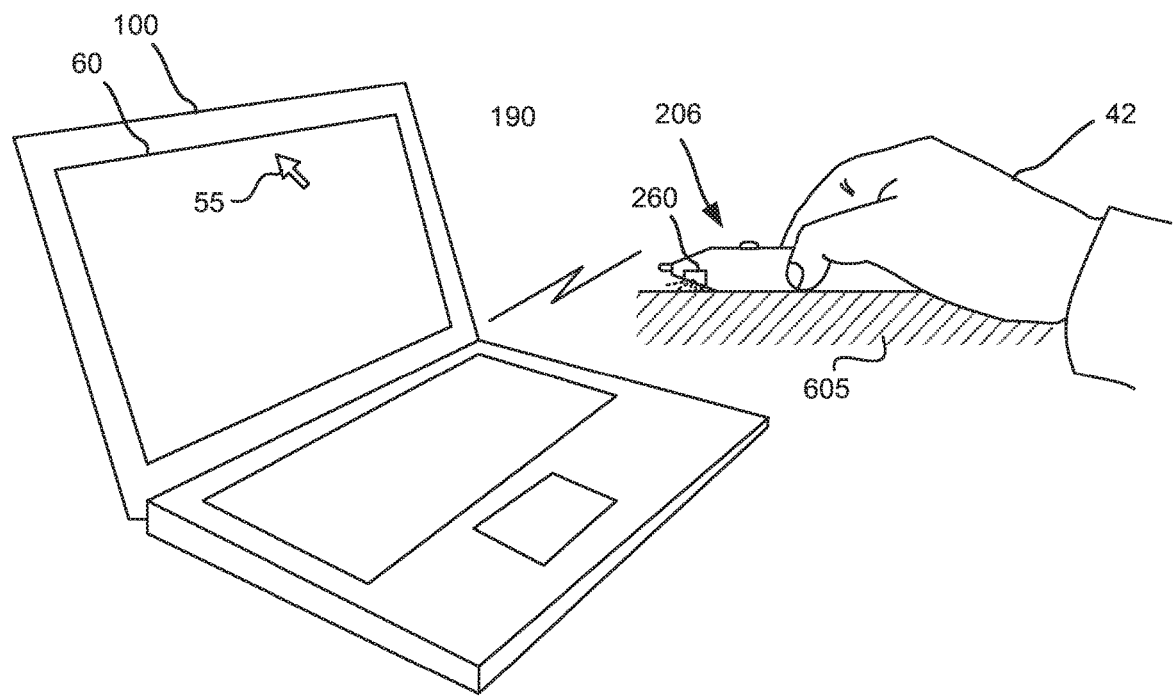
FIGS. 6A and 6B are schematic drawings of a user operating an optical sensor on a stylus in a horizontal and tilted orientation respectively.
Figure 6B:
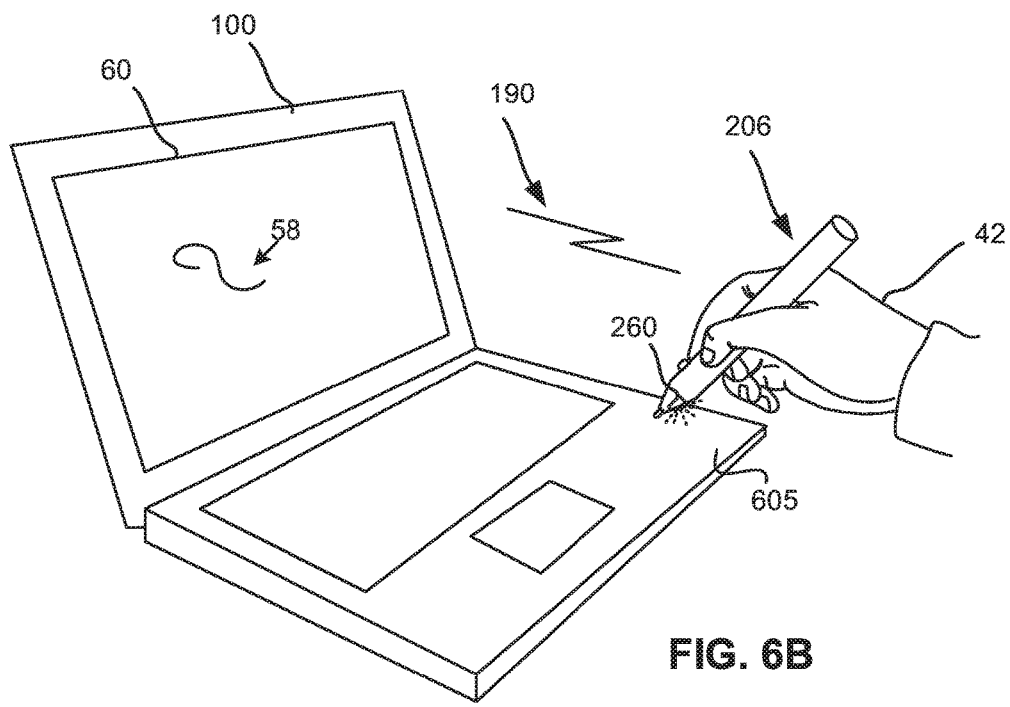

Reference is now made to FIGS. 6A and 6B showing schematic drawing of a user operating an optical sensor on a stylus in a horizontal and tilted orientation respectively. In some example embodiments, multiple functionality is added to a stylus by integrating an optical sensor 260 on an active stylus 206. Optical sensor 260 may sense movement of stylus 206 along a surface 605. Surface 605 may be a surface other than the touch-screen 60, e.g. a tabletop (FIG. 6A) or a surface on a laptop computer (FIG. 6B). In some example embodiments, optical sensor 260 may be oriented and configured to track a user's hand 42 moving stylus 206 while the stylus is positioned horizontally on a surface 605 (FIG. 6A) and while stylus 206 is held in a writing position (FIG. 6B). Optical sensor 260 may be operated in a same manner as a conventional optical mouse. Optical sensor 260 may detect two dimensional movement on surface 605 and transmit input to a computing device 100 via a wireless communication channel 190 based on the movement sensed. Input to computing device 100 may control position of a cursor 55 on touch-screen 60 without stylus 206 directly interacting with touch-screen 60 and may also be used to provided electronic inking 58. In some example embodiments, inking with optical sensor 260 may be performed with a higher resolution as compared to inking based on the electrostatic interface with touch-screen 60.

Figure 7:
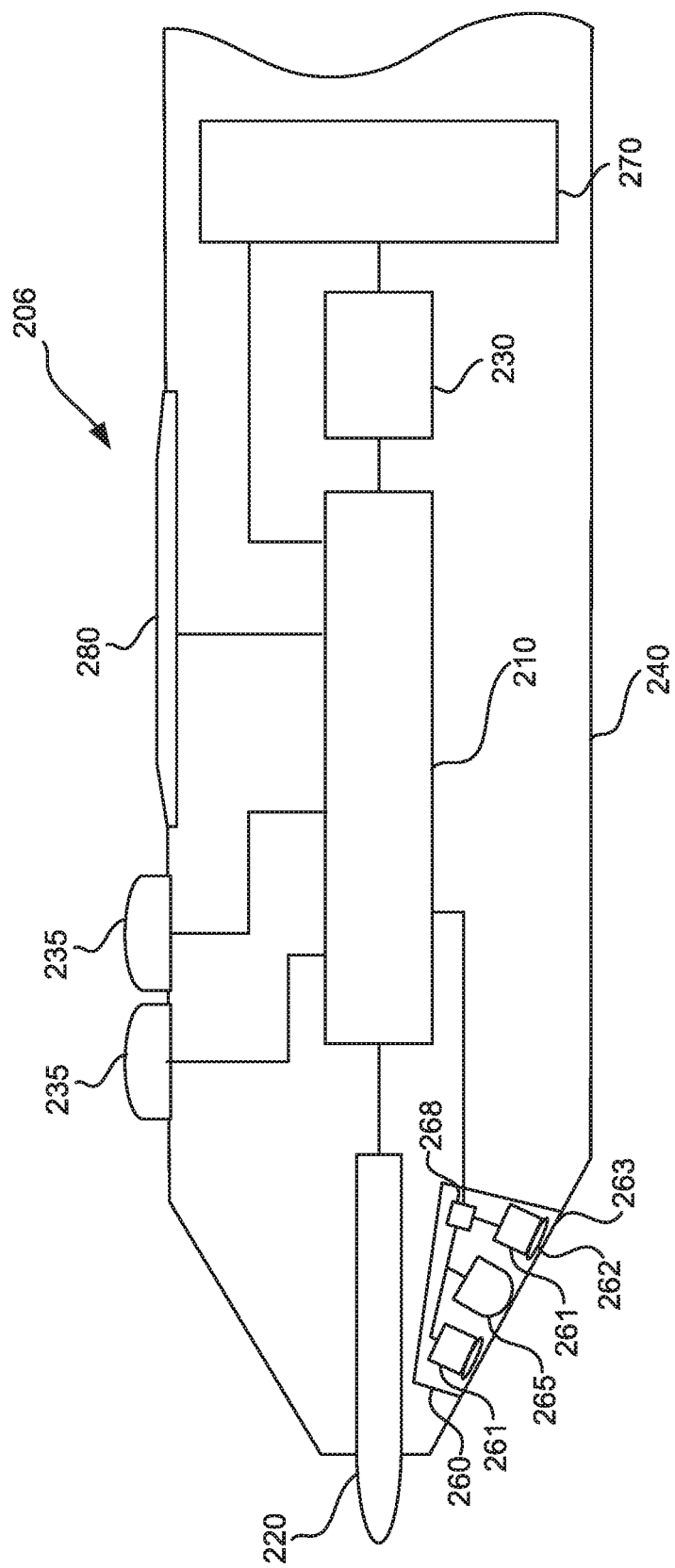
FIG. 7 is a simplified block diagram of a stylus including an example optical sensor with optional additional buttons and scroll feature.

Reference is now made to FIG. 7 showing a simplified block diagram of a stylus including an example optical sensor with optional additional buttons and scroll sensor feature. A stylus 206 may include an optical sensor 260 integrated on a portion of housing 240 that is tapered toward writing tip 220. Optionally, in this orientation, optical sensor 260 may be operated while a user is holding stylus 206 in a writing position. Optionally, in this orientation, optical sensor 260 may also be operated while stylus 206 is laying down on a surface (FIG. 6A). Alternatively, optical sensor 260 may be integrated along a portion of housing 240 that is not tapered and only operable while stylus 206 is laying flat against a surface.

Optical sensor 260 may include a Light Emitting Diode (LED) 265 that emits a light through an optical window 263. Light emitted by LED 265 may be reflected from a surface, e.g. tabletop back through optical window 263 and captured by a image sensor 261. Optionally, image sensor 261 is associated with optics 262. A processor 268 may compare a series of images to detect movement of optical window 263. In some example embodiments, optical sensor 260 includes a first image sensor 261 positioned and oriented to capture images while the stylus is being held in a writing position and includes a second image sensor 261 positioned and oriented to capture images while the stylus is positioned flat against a surface Processor 268 may detect images captured from each of the image sensors and select data from image sensor 261 that provides the best results. Optionally, stylus 206 includes a gyroscope and processor 268 may select one of the two image sensors to actuate for tracking based input from the gyroscope.

Stylus 206 may additionally include one or two user manipulated buttons 235 that provide mouse right click and mouse left click functionality. In some example embodiments, stylus 206 additional includes a capacitive sensing strip 280 integrated along a length of housing 240 that can be operated by a user's finger to provide a scroll command by sliding a finger along capacitive sensing strip 280. Optical sensor 260, buttons 235 and strip 280 may be controlled by ASIC 210. Input to a computing device 100 based on commands sensed with optical sensor 260, buttons 235 and strip 280 may be transmitted with a wireless communication unit 230. Operation of optical sensor 260, buttons 235 and strip 280 and wireless communication unit 230 may be powered by a power source 270 in stylus 206. Optionally power source 270 is a rechargeable battery.

Figure 8:
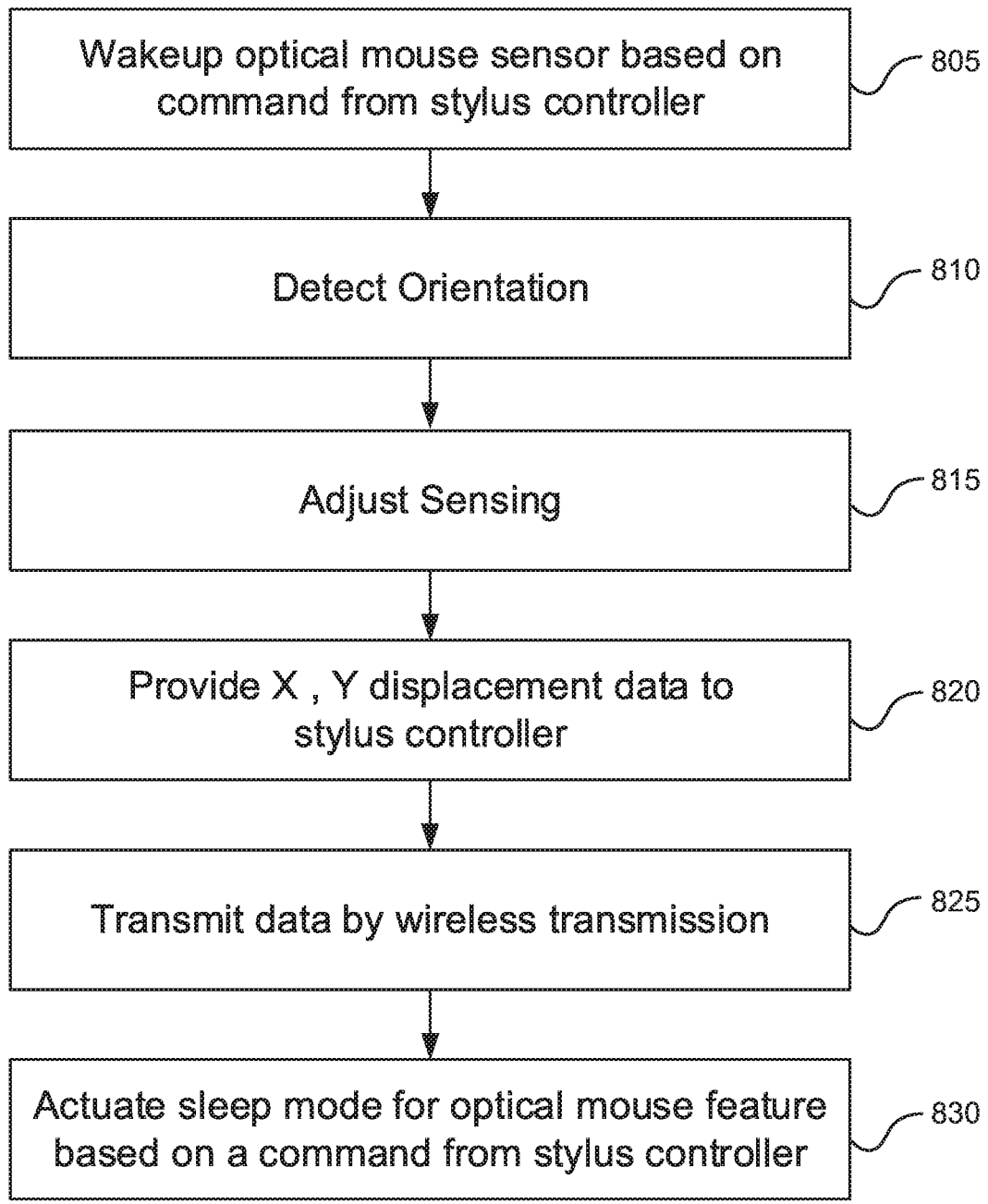
FIG. 8 is a simplified flow chart of an example method for operating a stylus with an optical sensor.

Reference is now made to FIG. 8 showing a simplified flow chart of an example method for operating a stylus with an optical sensor. Optical sensor may be selectively activated by a controller of the stylus, e.g. ASIC 210 and a wakeup command by the controller may initiate activation of the optical sensor (block 805). The optical sensor may be maintained in a sleep mode while the stylus is paired with a touch-screen of a computing device and may be activated based on sensing a break in the pairing. Optionally, a user may initiate activation of the optical sensor based on pressing a button on the stylus, e.g. one of buttons 235.

In some example embodiments, orientation of the stylus may be detected (block 810) and sensing of the optical sensor may be adjusted to the orientation detected (block 815). Based on sensed data, X-Y displacement commands are determined provided to stylus controller (block 820). The commands may then be transmitted by wireless transmission (block 825). Mouse tracking with the optical sensor may be selectively turned off by a controller of the stylus (block 830).

According to an aspect of some example embodiments there is provided a stylus comprising: an elongated housing including a first end and a second end, wherein the second end is opposite the first end; tip extending from the first end of the elongated housing, wherein the tip is configured to interact with a digitizer sensor of a touch screen; a first wireless transmitter configured to transmit a signal via the tip; a tri-axial force sensor mounted on the second end, wherein the tri-axial force sensor is configured to sense contact force applied by a user pressing against the tri-axial sensor; a second wireless transmitter configured to transmits output sensed by the tri-axial force sensor; and a controller configured to control transmission of the first wireless transmitter and the second wireless transmitter.

Optionally, the controller is configured to transmit cursor movement control commands based on output from two axes of the tri-axis force sensor.

Optionally, the controller is configured to transmit button press command based on output from one axis of the tri-axial force sensor.

Optionally, the tri-axial force sensor includes a magnetic encoded.

Optionally, the tri-axial force sensor includes a resistive strain gauge encoder.

Optionally, the tri-axial force sensor comprises: a user manipulated button extending from the second end; an elastic element attached to the user manipulated button and housed in the stylus and; a plurality of electrodes fixed to the housing and surrounding the elastic element, wherein the electrodes are configured to capacitively couple with the elastic element based on the elastic element pressing against one or more of the electrodes and wherein the elastic element is configured to press against the one or more of the electrodes based on force applied by a user pressing against the user manipulated button.

Optionally, the controller is configured to detect input based on interaction of the tip with a digitizer sensor of a touch screen and input based on the a tri-axial force sensor simultaneously.

Optionally, the controller is configured to transmit input based on the tri-axial force sensor via the first wireless transmitter based on sensing pairing between the stylus and a touch-screen.

Optionally, the controller is configured to transmit input based on the tri-axial force sensor via the second wireless transmitter based on sensing pairing between the stylus and a touch-screen.

According to an aspect of some example embodiments there is provided a stylus comprising: an elongated housing; a tip extending from one end of the elongated housing, wherein the tip is configured to interact with a digitizer sensor of a touch screen; a first wireless transmitter configured to transmit a signal via the tip; an optical sensor configured to track movement of the elongated housing on a surface other than the touch screen, wherein the optical sensor includes an optical window integrated on the elongated housing, and wherein the movement is detected via the optical window; a second wireless transmitter configured to transmits output sensed by the optical sensor; and a controller configured to control transmission of the first wireless transmitter and the second wireless transmitter.

Optionally, the optical sensor is integrated on a portion of the housing of the stylus that is tapered toward the tip.

Optionally, the optical sensor is configured to sense movement of the stylus on a surface while the stylus is laying flat against the surface.

Optionally, the is configured to sense movement of the stylus on a surface while the stylus is laying flat against the surface and also while the stylus is held in a writing position.

Optionally, the control is configured to sense pairing between the stylus and a touch-screen and to selectively turn ON/OFF operation of the optical sensor based on sensing the pairing.

Optionally, the stylus further comprises a sensing strip configured to capacitive sense a location of a finger along the strip.

Optionally, the controller is configured to transmit a scroll command based on output from the sensing strip.

Optionally, the stylus further comprises a pair of buttons integrated on the housing of the stylus wherein one of the pair provides right mouse click command and the other of the pair provides a left mouse click command.

Optionally, the optical sensor comprises: a first image sensor that is dedicated to track movement while the stylus is laying flat against the surface; a second image sensor that is dedicated to track movement while the stylus is held in a writing position; and an optical sensor controller configured to select processing movement based on one of the first image sensor and the second image sensor.

Optionally, the optical sensor controller is configured to select processing movement based on one of the first image sensor and the second image sensor based on detecting output from each of the first image sensor and the second image sensor.

Optionally, the stylus further includes a gyroscope, wherein the optical sensor controller is configured to select processing movement based on one of the first image sensor and the second image sensor based on output from the gyroscope.

Certain features of the examples described herein, which are, for clarity, described in the context of separate embodiments, may also be provided in combination in a single embodiment. Conversely, various features of the examples described herein, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

What is claimed is:

1. A stylus comprising:
an elongated housing;
a tip extending from one end of the elongated housing, wherein the tip is configured to interact with a digitizer sensor of a touch screen;

a first wireless transmitter configured to transmit a signal via the tip;
an optical sensor configured to:
track movement of the elongated housing on a surface other than the touch screen, wherein the optical sensor includes an optical window integrated on the elongated housing, and wherein the movement is detected via the optical window; and
sense movement of the stylus on a surface while a portion of the elongated housing is laying against the surface;
a second wireless transmitter configured to transmits output sensed by the optical sensor; and
a controller configured to control transmission of the first wireless transmitter and the second wireless transmitter.

2. The stylus according to claim 1, wherein the optical sensor is integrated on a portion of the housing of the stylus that is tapered toward the tip.

3. The stylus according to claim 1, wherein the optical sensor is configured to sense movement of the stylus on the surface while the stylus is laying flat against the surface.

4. The stylus according to claim 1, wherein the optical sensor is configured to sense movement of the stylus on a surface while the stylus is laying against the surface and while the stylus is held in a writing position.

5. The stylus according to claim 1, wherein the controller is configured to sense pairing between the stylus and a touch-screen and to selectively turn ON/OFF operation of the optical sensor based on sensing the pairing.

6. The stylus according to claim 1, further comprising a sensing strip configured to capacitively sense a location of a finger along the strip.

7. The stylus according to claim 6, wherein the controller is configured to transmit a scroll command based on output from the sensing strip.

8. The stylus according to claim 1, further comprising a pair of buttons integrated on the housing of the stylus wherein one of the pair provides right mouse click command and the other of the pair provides a left mouse click command.

9. The stylus according to claim 1, wherein the optical sensor comprises:
a first image sensor that is dedicated to track movement while the stylus is laying flat against the surface;
a second image sensor that is dedicated to track movement while the stylus is held in a writing position; and
an optical sensor controller configured to select processing movement based on one of the first image sensor and the second image sensor.

10. The stylus according to claim 9, wherein the optical sensor controller is configured to select processing movement based on one of the first image sensor and the second image sensor based on detecting output from each of the first image sensor and the second image sensor.

11. The stylus according to claim 9, comprising a gyroscope, wherein the optical sensor controller is configured to select processing movement based on one of the first image sensor and the second image sensor based on output from the gyroscope.

12. An apparatus comprising:
an elongated housing;
a tip extending from one end of the elongated housing, wherein the tip is configured to interact with a digitizer sensor of a touch screen;
a first wireless transmitter configured to transmit a signal via the tip;
an optical sensor configured to:
track movement of the elongated housing on a surface other than the touch screen, wherein the optical sensor includes an optical window integrated on the elongated housing, and wherein the movement is detected via the optical window; and
sense movement of the apparatus on a surface while a portion of the elongated housing is laying against the surface
a second wireless transmitter configured to transmits output sensed by the optical sensor; and
a controller configured to control transmission of the first wireless transmitter and the second wireless transmitter.

13. The apparatus according to claim 12, wherein the optical sensor is integrated on a portion of the housing of the apparatus that is tapered toward the tip.

14. The apparatus according to claim 12, wherein the optical sensor is configured to sense movement of the apparatus on the surface while the apparatus is laying flat against the surface.

15. The apparatus according to claim 12, wherein the optical sensor is configured to sense movement of the apparatus on a surface while the apparatus is laying against the surface and while the apparatus is held in a writing position.

16. The apparatus according to claim 12, wherein the controller is configured to sense pairing between the apparatus and a touch-screen and to selectively turn ON/OFF operation of the optical sensor based on sensing the pairing.

17. The apparatus according to claim 12, further comprising a sensing strip configured to capacitively sense a location of a finger along the strip.

18. The apparatus according to claim 17, wherein the controller is configured to transmit a scroll command based on output from the sensing strip.

19. The apparatus according to claim 12, further comprising a pair of buttons integrated on the housing of the apparatus wherein one of the pair provides right mouse click command and the other of the pair provides a left mouse click command.

20. The apparatus according to claim 12, wherein the optical sensor comprises:
a first image sensor that is dedicated to track movement while the apparatus is laying flat against the surface;
a second image sensor that is dedicated to track movement while the apparatus is held in a writing position; and
an optical sensor controller configured to select processing movement based on one of the first image sensor and the second image sensor.

* * * * *